United States Patent
Hand et al.

(10) Patent No.: US 7,354,875 B2
(45) Date of Patent: Apr. 8, 2008

(54) STAB RESISTANT AND ANTI-BALLISTIC MATERIAL AND METHOD OF MAKING THE SAME

(75) Inventors: David R. Hand, Snellville, GA (US); Rudiger Hartert, Wuppertal (DE); Christian Bottger, Remscheid (DE)

(73) Assignee: Teijin Twaron GmbH, Wuppertal (DE)

( * ) Notice: Subject to any disclaimer, the term of this patent is extended or adjusted under 35 U.S.C. 154(b) by 0 days.

(21) Appl. No.: 10/357,457

(22) Filed: Feb. 4, 2003

(65) Prior Publication Data
US 2004/0023580 A1   Feb. 5, 2004

Related U.S. Application Data

(60) Provisional application No. 60/354,498, filed on Feb. 8, 2002.

(51) Int. Cl.
*B32B 27/12* (2006.01)

(52) U.S. Cl. .................. 442/134; 442/135; 428/152; 428/911; 8/115.51; 8/137

(58) Field of Classification Search ............... 428/152, 428/911; 442/134, 135; 8/115.51, 137
See application file for complete search history.

(56) References Cited

U.S. PATENT DOCUMENTS

| | | | |
|---|---|---|---|
| 4,850,050 A | 7/1989 | Droste et al. | |
| 5,124,195 A * | 6/1992 | Harpell et al. | 428/152 |
| 5,185,195 A | 2/1993 | Harpell et al. | |
| 5,202,086 A | 4/1993 | Baliga et al. | |
| 5,565,264 A | 10/1996 | Howland | |
| 5,578,358 A | 11/1996 | Foy et al. | |
| 5,581,856 A | 12/1996 | Krummheuer et al. | |
| 5,622,771 A | 4/1997 | Chiou et al. | |
| 5,788,907 A | 8/1998 | Brown, Jr. et al. | |
| 5,918,309 A | 7/1999 | Bachner, Jr. | |
| 5,960,470 A | 10/1999 | Bachner, Jr. | |
| 6,103,646 A | 8/2000 | Chiou | |
| 6,133,169 A | 10/2000 | Chiou et al. | |
| 6,162,746 A | 12/2000 | Chiou | |
| 6,233,978 B1 | 5/2001 | Gehring, Jr. et al. | |

(Continued)

FOREIGN PATENT DOCUMENTS

GB      2 322 638 A      9/1998

(Continued)

OTHER PUBLICATIONS

National Institute of Justice, "Ballistic Resistance of Personal Body Armor", NIJ Standard-0101.04, Jun. 2001.

(Continued)

*Primary Examiner*—Ula C Ruddock
(74) *Attorney, Agent, or Firm*—Oliff & Berridge, PLC

(57) ABSTRACT

The invention relates to a fabric having both stab resistant and anti-ballistic properties. The fabric is made of yarn of a weight greater than about 500 dtex, and the fabric has a minimum shrinkage factor of at least about 1% achieved through a densification treatment. The invention further relates to a method of producing a such a fabric having the steps of agitating a fabric made of a yarn of a weight greater than about 500 dtex, substantially removing a spin finish from the fabric before, during or after the agitating step, and drying the fabric.

38 Claims, 4 Drawing Sheets

U.S. PATENT DOCUMENTS

| | | | |
|---|---|---|---|
| 6,656,570 B1 * | 12/2003 | Fels et al. | 428/155 |
| 6,668,868 B2 * | 12/2003 | Howland et al. | 139/383 R |
| 2001/0002351 A1 | 5/2001 | Howland | |

FOREIGN PATENT DOCUMENTS

| | | |
|---|---|---|
| WO | WO 92/14608 | 9/1992 |
| WO | WO 93/00564 | 1/1993 |

OTHER PUBLICATIONS

National Institute of Justice, "Stab Resistance of Personal Body Armor", NU Standard-0115.00, Sep. 2000.

Then Airflow AFS, High Temperature Jet Dyeing Machine, (http://www.then.de).

Summary AATCC Test Method 135-2004, Dimensional Changes of Fabrics After Home Laundering (developed in 1970).

Page 281 from "Essentials of Textiles", 4$^{th}$ Edition (1988).

"Typical & Comparative Properties of KEVLAR® ", (Dec. 1992).

National Institute of Justice, "Ballistic Resistance of Personal Body Armor", NIJ Standard-0101.04, Jun. 2001.

National Institute of Justice, "Stab Resistance of Personal Body Armor", NIJ Standard-0115.00, Sep. 2000.

Then Airflow AFS, High Temperature Jet Dyeing Machine, (http://www.then.de), no date given.

* cited by examiner

STAB RESISTANT AND ANTI-BALLISTIC MATERIAL AND METHOD OF MAKING THE SAME

BACKGROUND OF THE INVENTION

1. Field of Invention

The present invention relates to a protective fabric having a high puncture resistance and a high ballistic resistance, and to objects such as clothing incorporating the fabric thereon.

2. Description of Related Art

There is a growing need, especially in the field of law enforcement, for protective clothing that protects a wearer against penetration of a variety of dangerous instruments. Typically, protective clothing is designed to be resistant to either stabbing materials, i.e., ice picks, knives and the like, or ballistic threats, but not both. In some circumstances, it is not practical or safe to be protected from only one of these threats. Nor is it practical to wear multiple layers of protective wear, wherein each individual layer is designed for a different threat.

Several approaches have been set forth to protect against both stabbing and ballistic threats. One typical prior art approach is to add stab resistant materials to ballistic resistant fabrics. For example, a stab resistant metal sheet such as titanium has been employed with a ballistic resistant fabric. However, such constructions are quite bulky and uncomfortable to the point of being impractical.

U.S. Pat. No. 5,185,195 teaches using multiple layers of fabric secured together through closely spaced rows of stitching. Ceramic disks may also be included into the garment to provide further protection.

U.S. Pat. No. 6,162,746 teaches a stab resistant material made from a plurality of layers of woven polybenzoxazole or polybenzothiazole fibers, a plurality of ballistic layers, and a plurality of tightly-woven penetration resistant layers. The fabric disclosed is of 500 dtex or smaller.

U.S. Pat. No. 6,133,169 teaches a combination of layered structures for protection against both stab penetration and ballistic threats. The layered structure comprises flexible metallic based structures, tightly-woven fabric layers, and ballistic layers.

U.S. Pat. No. 5,565,264 teaches a protective layer formed from a plurality of layered, densely woven base fabrics. Each of the densely woven base fabrics is formed by tightly weaving multifilament yarns to obtain a warp yarn "density" in excess of 100% at the center of the fill yarn. The yarns themselves comprise materials such as KEVLAR®, SPECTRA® OR VECTRAN®, and comprise a coating of ballistic resistance material to achieve a penetration resistance.

Protective garments for stab resistance and/or ballistic resistance are typically expensive to produce, both in the form of a fabric and a final form. Further, the processes for producing the protective fabric and garment typically result in a garment that is stiff and not drapable. Such garments can be considered uncomfortable and restrictive to the wearer. Thus, some wearers may forego wearing the protective garments when they should in fact be required.

A protective fabric that is resistant to both stabbing penetrations and ballistic threats, as well as offering comfort to a wearer and/or has high drapability for ease in use and application, is desired. Typically, a fabric is not resistant to both stab penetrations and ballistic threats due to the varied dissipations of energy and different physical infiltration of each type of threat upon the material. The protective fabric should be more drapable, more comfortable and less restrictive than known protective fabrics. Further, the fabric should be less expensive to produce, and therein more available to the public.

SUMMARY OF THE INVENTION

Various exemplary embodiments of the present invention relate to a protective fabric and garment that reduces the risk of injury to the wearer from a stabbing instrument and from ballistic weapons. In various exemplary embodiments, the protective garment comprises a plurality of fabric layers. Each fabric layer comprises a high strength fiber such as, for example, TWARON® para-aramid.

An exemplary embodiment of the present invention comprises a woven fabric, preferably having a maximum practical cover factor, woven from yarns having a weight of from greater than about 500 dtex, and which woven fabric is stab resistant when formed into a multiple ply structure of at least about 8 plies. The multiple ply structure of exemplary embodiments of the present invention exhibits stab resistance in accordance with National Institute of Justice (NIJ) Standard-0115.00.

Various exemplary embodiments of the present invention comprise a protective fabric having a high penetration resistance, comprising a plurality of layers of fabric comprising yarn of weights above about 500 dtex. Exemplary embodiments of the invention also comprise a method for producing such a protective fabric comprising preparing a fabric from high strength yarns, and densifying the fabric such that the penetration resistance is increased.

In various exemplary embodiments of the present invention, once the fabric has been prepared from the yarns, the fabric is subjected to a process to increase the penetration resistance of the fabric by (a) densifying the fabric, preferably through a minimum of at least about 1% shrinkage, and/or (b) fibrillating the yarns of the fabric. A spin finish on the filaments of the yarn may or may not be removed during this process. The shrinkage of the fabric during densification engages a greater number of fibers in a particular area to increase the resistance to penetration of a penetrating device. The increase in penetration resistance may also result from fibrillation of the yarns/filaments of the fabric.

In various exemplary embodiments of the present invention, ballistic threat resistance against low energy handgun bullets as specified in National Institute of Justice (NIJ) Standard-0101.04 (June, 2001) is achieved. The various exemplary embodiments also achieve the properties required by NIJ Standard-0115.00 (September, 2000) for stab resistance of personal body armor.

DETAILED DESCRIPTION OF PREFERRED EMBODIMENTS

Figure 1:
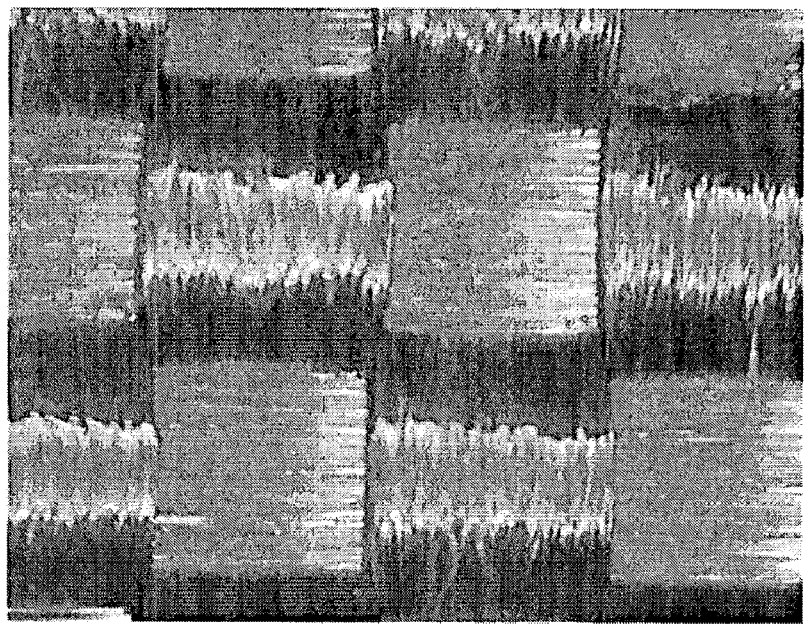
FIG. 1 is a microphotograph of a fabric before being processed according to the various exemplary embodiments of the present invention.

The protective material of the various exemplary embodiments of the invention shows increased protection against both stabbing or thrusting penetrants, i.e., ice picks, knives and the like, and ballistic threats, i.e., bullets fired from weapons. Typically, known materials are protective against either stabbing threats or ballistic threats, but not both. The protective materials of the present invention, however, exhibit increased protection against both types of threats while being drapable, comfortable and wearable.

The fabric of the various exemplary embodiments of the invention is highly drapable, lightweight, and more comfortable than other types of body armor or protective materials available. This increases the chances that someone in a situation wherein stabbing or ballistic threats are more typical, i.e., for corrections officers or riot police, will be more likely to wear the protective gear since the cumbersome and heavy nature of the clothing would be reduced.

The yarns of the fabric of the various exemplary embodiments of the invention may comprise any known high strength material in the field of ballistic and/or stab resistance. The yarns of the fabric may comprise, for example, para-aramids (poly(p-phenylene terephthalamide)) (PPTA) such as TWARON®, KEVLAR®, TECHNORA®, ARMOS®, TERLON® or RUSAR®, poly(m-xylene adipene), poly(p-xylene sebacamide), aliphatic and cycloaliphatic polyarnides, such as the copolyarnide of 30% hexamethylene diammonium isophthalate and 70% hexamethylene diammonium adipate, the copolyarnide of up to 30% bis-(amidocyclohexyl)methylene, terephthalic acid and caprolactam, polyhexamethylene adipamide, high density polyethylenes such as SPECTRA®, liquid crystal polyesters, e.g., VECTRAN®, benzimidazole such as M5, oxazoles such as ZYLON®, and the like. Most preferably, the yarns are comprised of para-aramid. Aramid is a term known in the art to mean a polyamide wherein at least about 85% of the amide (—CO—NH—) linkages are attached directly to two aromatic rings. In the various exemplary embodiments of the yarns preferably comprise, for example, TWARON® 550 dtex, TWARON® 840 dtex, TWARON® 930 dtex and TWARON® 1100 dtex.

The yarns of the various exemplary embodiments of the invention comprise multiple filaments of material. Any number of filaments per strand of yarn may be used without limitation. The number of filaments per strand of yarn may be, for example, from about 200 to about 5,000 filaments. More preferably, the yarns comprise about 500 to about 1,500 filaments per strand of yarn. The filaments may have any fineness, but most preferably have a fineness of less than about 1.65 dtex. (Dtex is defined as the weight, in grams, of 10,000 meters of the material).

Further, in the various exemplary embodiments of the invention, the yarns of the fabric comprised of multiple filaments may have any dtex. However, in a preferred embodiment, the yarns have a dtex of from above at least about 500 dtex, preferably of from about 510 dtex to about 2,000 dtex, prior to incorporation in the fabric of the invention, and more preferably above about 550 dtex, e.g., from about 550 dtex to about 1,100 dtex, prior to incorporation into the fabric.

Fabric of the various exemplary embodiments of the invention may be prepared by any construction known in the art. In various exemplary embodiments, however, the fabric is woven from the multifilament yarns. Preferably, the weave is a dense weave in which the interstitial space between yarns is kept to a minimum (i.e., the woven fabric has as high a cover factor as practical). This provides mainly penetration resistance.

In various exemplary embodiments, once the fabric is prepared, preferably by dense weaving as discussed above, and either before or after the fabric is formed into a multi-ply structure, the fabric is subjected to a post-fabric formation treatment process in order to increase the stab resisting characteristics of the fabric. The post-fabric formation treatment process may be a single step or multiple steps of the same or different nature as detailed below.

At a minimum, the treatment of the fabric must increase the frictional resistance of the fabric, i.e., increase the ability of the fabric to withstand penetration from a penetrating item such as a spike-type or knife-type penetrant. At a minimum, increasing frictional resistance means increasing the resistance to withstand penetration beyond that achieved by the simple and conventional removal of the spin finish that acts as a lubricant on the fabric. Preferably, the spin finish is at least substantially removed from the yarn. For example, the penetration resistance of the fabric is preferably increased to an extent that the fabric is able to satisfy the NIJ Standard-0115.00 for stab resistance when used in a structure of at least 8 plies. In various exemplary embodiments, increasing the frictional resistance of the fabric can be done by one or more of (a) densifying the fabric to reduce the interstitial space between yarns, (b) shrinking the fabric for the same reasons, and/or (c) increasing fibrillation of yarns/filaments of the fabric. These methods are not exclusive to one another, and a given treatment may effect one or a combination of more than one, including all, of these results that increase frictional resistance of the fabric.

In a preferred embodiment, processing the fabric to increase the frictional resistance of the fabric is accomplished by subjecting the fabric to an agitation treatment. Herein, "agitation treatment" means any process subjecting the fabric to agitation for any amount of time. However, any other process that achieves an increased penetration resistance, e.g., by increasing density, shrinkage and/or fibrillation of the fabric, in one or more steps, may also be used.

A suitable agitation treatment cycle may be performed one or more times. Preferably, the agitation treatment occurs in the presence of a liquid system, although such is not required. The agitation treatment has the advantage of achieving each of the densification, shrinkage and fibrillation results.

In one embodiment, the agitation treatment may preferably be carried out using an agitation-type action washing machine. However, the present invention is not limited thereto, and may comprise a tumbling-type washing machine.

Any liquid system accomplishing the increase in frictional resistance requirements of the fabric may be used in the agitation treatment. Thus, water may be used, and may be cold, warm or hot. Preferably, the water is hot. Of course, liquids other than water may also be used, e.g., mild organic solvents, which solvents preferably that do not dissolve the fabric material.

Preferably, a detergent is added in the liquid system, e.g., in the water. Including a detergent has the additional advantage of assisting in substantial removal of the spin finish of the fabric. However, the spin finish could also be substantially removed by any other conventional method known in the art such as, e.g., a scouring process. Such a separate step of removing the spin finish in the process may be conducted before or after the agitation treatment.

In another preferred embodiment, the agitation may be carried out by treating the fabric in a so-called jet dyeing machine, for example such as available as AIRFLOW® AFS (THEN Maschinen and Apparatebau GmbH, Schwabisch Hall, Germany) or AIRO quattro® (Biancalani, Prato, Italy). When the process is carried out in such devices, the fabric treated in these devices has also all the same desirable features of the treated fabric as discussed herein.

A high temperature jet dyeing machine allows for washing, softening and drying of woven or knitted fabrics. The device allows, like the washing machine, a batchwise operation, but also allows the treatment of much higher volumes than the washing machine.

Most preferably, the fabric to be treated in such a jet dyeing device is not entered into the device in layer form, but is instead in the form of a rope.

A fabric, for example having a length of about 400 m and a width of about 1.3 m, is wound around an inner core and located outside the device. A first portion of the flat fabric is taken and brought into a rope-like configuration, e.g., by twisting. The rope is then fed into the inlet opening of the device and drawn by a reel (e.g., winch) located at the inlet for further transportation into the device.

After this first insertion, the rope is automatically further transported through the device, and after the first cycle the first portion is retained, for example by hand, through a special opening in the device.

After the first insertion of the rope, the flat fabric is automatically further rolled off the core and drawn into the device, again in rope form. When the fabric is totally removed from the core, the end portion of the fabric is preferably taken and fixed to the retained first portion, for example by stitching. Now, the fabric has the form of an endless rope in the device.

The rope is preferably treated with a hot aerosol in the device, for example with a dispersion of liquid particles (water and/or water and detergent) in a gaseous medium (e.g., air) under high pressure and forced through a cone shaped element (e.g., a funnel). Inclusion of baffle plates in the device can result in a compaction in a direction of the length of the fabric as the fabric contacts one or more of the baffles during the treatment. During the treatment, the fabric is also compacted by torsion.

It is also possible to carry out the agitating and compaction step in several cycles with insertion of the liquid system (injection mode), followed by additional cycles without insertion of the liquid system (tumbling mode). For example, the rope can be treated for about 15 minutes at 60° C. with insertion of water containing a detergent and air (injection mode). This cycle may then be followed by a cycle of about 15 minutes without insertion (tumbling mode). This tumbling mode can be followed by a second injection mode and by a second tumbling mode, etc., until the requested fabric properties are achieved.

Following treatment in the device, the rope may be rinsed in, for example, water or other solvent, preferably pure water, and afterwards air dried in the device or, following removal from the device after rinsing, air dried naturally or with heat assistance.

The inventors of the present invention have found that agitating the fabric by any suitable means provides surprising results. The wisdom of the art has been to carefully handle the fabric during the manufacturing process so as to minimally disturb the fabric or yarns therein. It is believed that if a substantial disturbance occurs, the ballistic resistance of the fabric would be destroyed. However, the agitation treatment intentionally and significantly disturbs the fabric with surprisingly beneficial results (e.g., providing penetration resistance) and without destroying the ballistic resistance of the fabric. In particular, although agitation treatment does lower the ballistic resistance of the fabric, it is surprisingly only minimal and the fabric can still satisfy NU Standard-0101.04, and the fabric also surprisingly exhibits excellent stab resistance following the agitation treatment.

The fabric of the present invention also possesses properties contrary to the teachings in the art, e.g., the teachings in U.S. Pat. Nos. 5,578,358, 6,133,169 and 5,622,771. These references teach that "acceptable penetration resistance can be obtained only when the linear density of the aramid yarns is less than 500 dtex. Aramid yarns of greater than 500 dtex, even when woven to a fabric tightness factor of nearly 1.0, are believed to yield between the adjacent yarns and permit easier penetration of a sharp instrument." (See, e.g., U.S. Pat. No. 5,622,771, column 3, lines 31-17). In various exemplary embodiments of the present invention, surprising results are obtained for both stab and ballistic resistance with para-aramid yarns having a dtex of greater than about 500 dtex. Of course, similar results are also realized in various exemplary embodiments of the present invention with yarns having a dtex less than 500 dtex.

As will be discussed more fully below, the ballistic and stab resistant material of the various exemplary embodiments of the invention preferably comprises multiple plies of the fabric. Preferably, single ply sheets of the fabric are subjected to the agitation step, separately or together. Each ply is at least preferably rinsed prior to preparing a multi-ply structure. However, multiple layers of the fabric already physically combined into a multi-ply structure could also be agitated to achieve the present invention.

Once subjected to the agitation step, the fabric is dried. The drying of the fabric may be simply in air, or may be heat assisted. In an exemplary embodiment, the fabric is air dried.

A goal of the process (e.g., post-fabric formation treatment, spin finish removal and/or drying) is to achieve densification of the fabric, for example to achieve a fabric shrinkage factor of a minimum of at least about 1%. Preferably, a shrinkage factor of about 2 to about 10% is achieved. Most preferably, the shrinkage factor is at least about 3%, e.g., about 3 to about 5%. This shrinkage factor results in densification of the yarns and filaments.

"Shrinkage factor," as recited herein, means a measured amount of shrinkage of the fabric as a result of the processing. It should be noted that the fiber itself does not shrink to an appreciable amount.

FIG. 1 is a mircophotograph of a fabric before being processed according to the various embodiments of the present invention. It can be seen that openings and/or gaps are present at the intersection of and between yarns.

These openings and/or gaps may allow for easier penetration by a forced object such as an ice pick or bullet, because the penetrating object may actually be able to slide into such openings and push the surrounding yarns out of the way, and therein penetrate further through the fabric.

Figure 2:
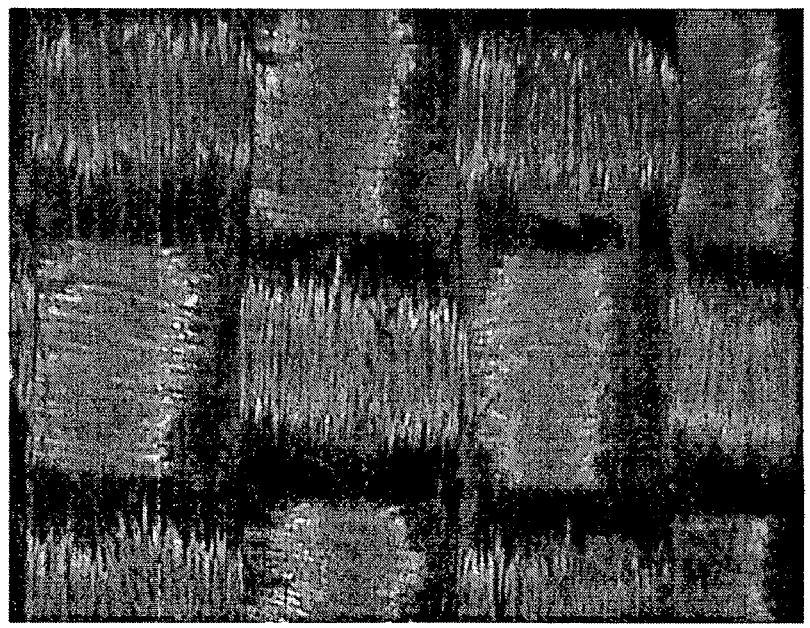
FIG. 2 is a microphotograph of a fabric after being processed according to the various exemplary embodiments of the present invention.

FIG. 2 is a microphotograph after having been processed according to the various embodiments of the present invention.

In FIG. 2, in contrast to FIG. 1, the openings and/or gaps between adjacent and intersecting yarns are more closed up. The apparent closing up of the openings between the yarns is believed to decrease the comparable ease at which a forced object might penetrate through and push aside the yarns of the fabric.

Figure 3:
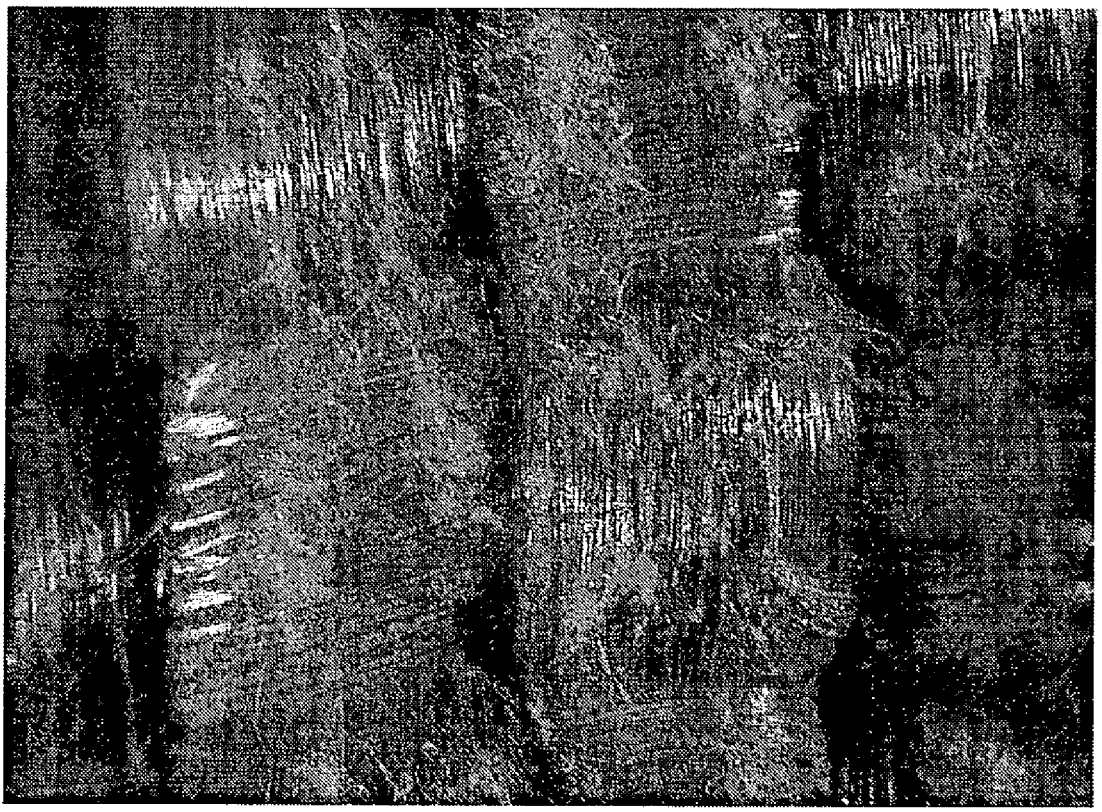
FIG. 3 is a microphotograph of a fabric that particularly shows the fibrillation of the yarns/fibers of the fabric following treatment by the process of an exemplary embodiment of the present invention.

It should also be noted that the threads of the processed yarn of FIG. 2 are fibrillated as compared to the threads of the yarns of FIG. 1. This fibrillation is more apparent in the fabric shown in FIG. 3, which was also prepared in accordance with the process of the present invention, in particular utilizing a jet dyeing machine as discussed above.

Another goal of the treatment process is also to preferably fibrillate the yarn and/or filaments of the fabric.

In a preferred embodiment, the agitation treatment and spin finish removal leaves the fabric free of any foreign coatings or additives in an amount greater than about 2%.

It is believed that as a result of the processing, the fabric shrinkage densifies the fabric in order to fibrillate the yarns and expose more filaments at the surface of the fabric. Interstices of the fabric are noticeably reduced in size and appear to "close-up." The yarns of the fabric preferably exhibit agglomerations of fibrils in the area of the openings and/or gaps between adjacent and intersecting yarns following the processing treatment(s). This engages a greater number of yarn filaments with a stabbing or ballistic penetrant and reduces any microscopic holes or visible interstices through which a penetrant may compromise the material simply by pushing the yarns of the fabric out of the way. In other words, the frictional resistance against the penetrant is increased by densifying the yarns of the fabric.

After processing a dense woven fabric, a dramatic increase in drapability, flexibility and generally a much softer hand is realized, with the fabric resembling a crepe fabric in appearance. This appears to allow the fabric to conform more readily and essentially "wrap" around the point of the penetrant yielding an increasing resistance to penetration as the penetrant attempts to travel through several plies of the fabric.

Figure 4:
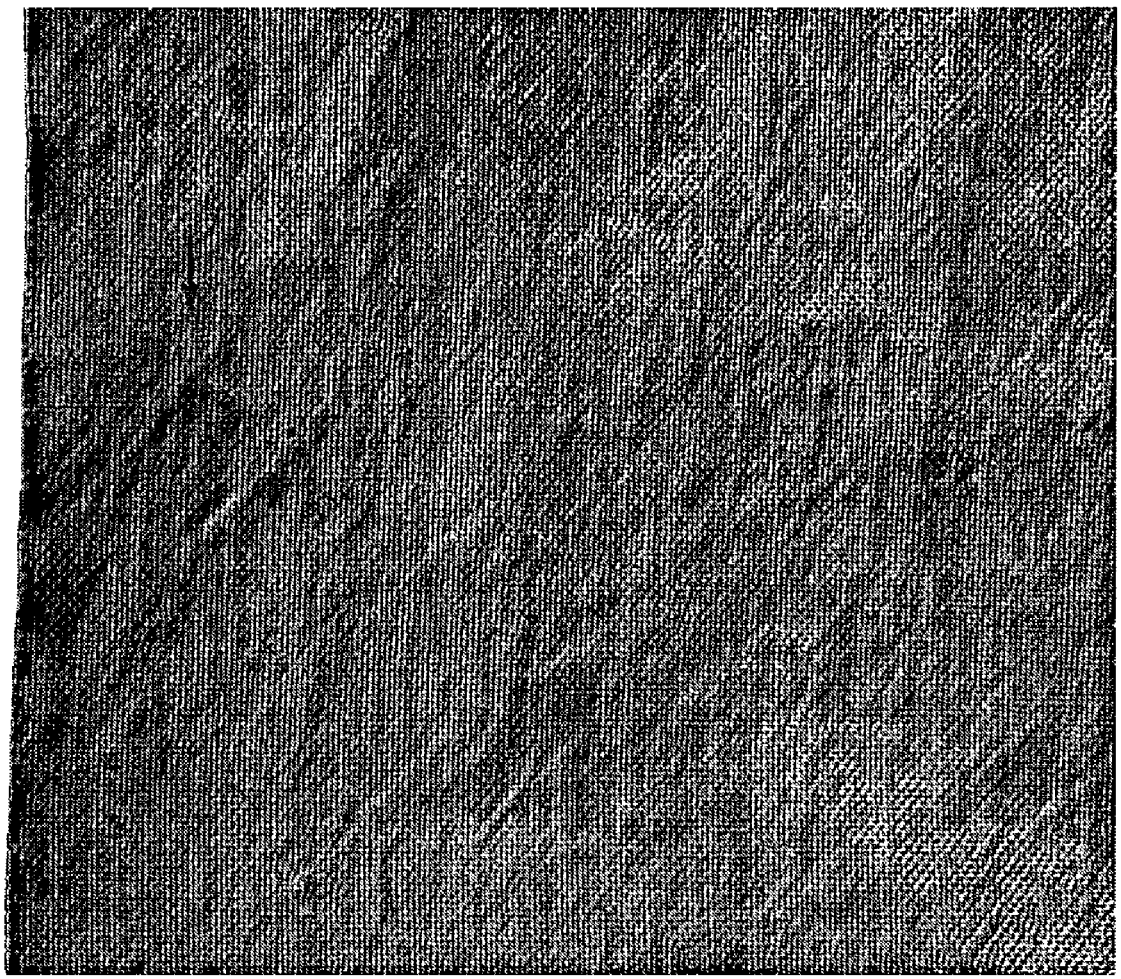
FIG. 4 is a microphotograph of a fabric showing the wrinkle structure introduced to the fabric by the treatment process.
Figure 5:
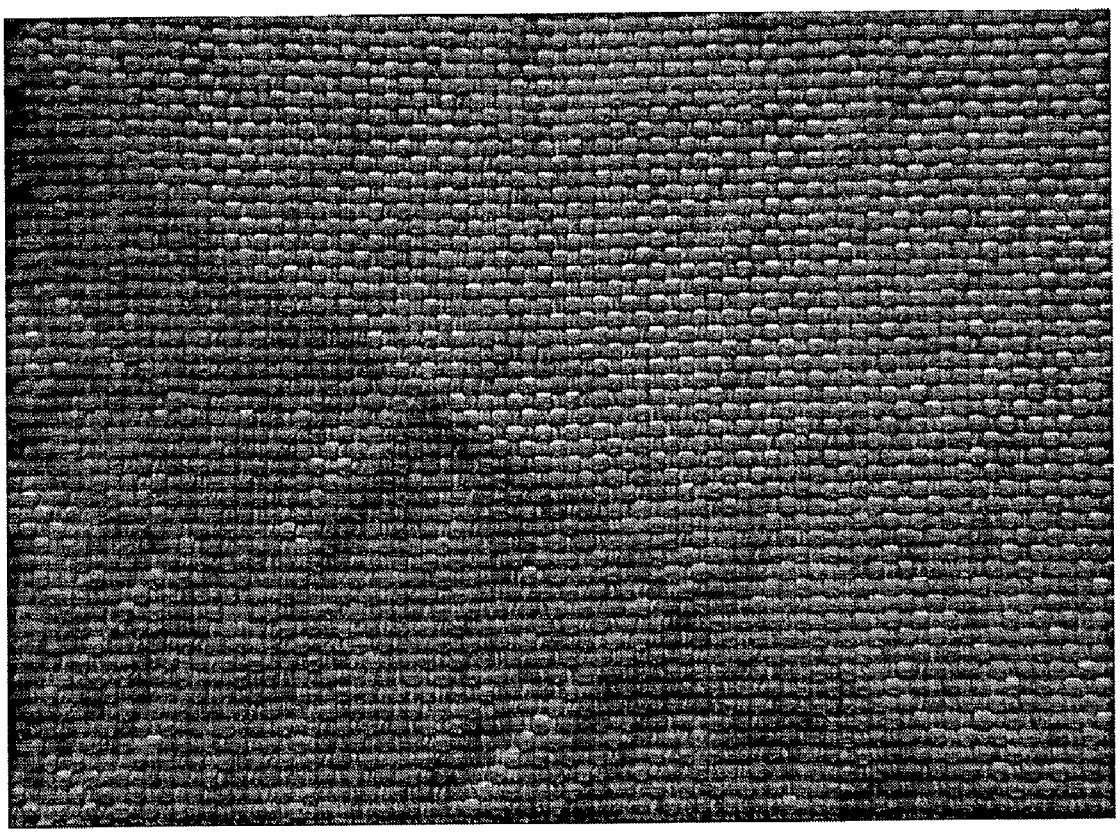
FIG. 5 is a closer up view of the wrinkle structure of FIG. 4.

In appearance following the processing, the fabric has creases and wrinkles. The wrinkles may form an angle of, for example, about 45° with respect to the weft and warp yarns of the fabric, although such is not necessary. See, for example, FIGS. 4 and 5 illustrating such a wrinkle structure. Such angled wrinkles may be realized through an agitation type treatment of the fabric. However, the wrinkles may also form to run parallel to the weft and/or warp of the yarns. This wrinkle structure may be realized through a treatment of the fabric employing a jet dyeing device.

The number of plies of the treated fabric used in an end stab and ballistic resistant material structure is preferably at least about 8. However, the minimum number of plies of processed fabric depends upon the particular type of yarn comprising the fabric and the intended threat level for the fabric. In general, however, the material may have from, e.g., about 8 to about 100 or more plies, preferably about 8 to about 70 plies, most preferably about 20 to about 50 plies, of the fabric. Of course, the plies of treated fabric may be used in conjunction with plies of non-treated fabric. For example, a material/structure may be comprised of, e.g., about 8 or more plies of treated fabric (to impart stab resistance) and about 2 or more plies, preferably 8 or more plies, of non-treated ballistic resistant fabric.

The present invention may be used in a variety of circumstances. For example, the fabric may be used to form any type of protective clothing, such as, for example, vests, suits, hats, gloves, shoes, etc. The fabric could also be used as a lining in any such type of clothing. The material could also be used to protect military or commercial vehicles. For example, it may be used as lining material, e.g., of gas tanks and/or in and around airplane engines, etc. These examples are not meant to be exhaustive, but are set forth as constructive examples. In other words, the fabric can be used in any environment and application where ballistic and/or penetration resistance is desired without limitation.

The invention will be further illustrated by way of the following examples.

The treated fabric of the present invention is subjected to spike threats based on varied drop penetrant forces and fabric weights. In the tests, the spike penetrant is dropped at a 90° angle with respect to the material of the invention. The spike penetrant includes a particular weight to mimic varying forces of a thrusted spike into the material.

Examples 1-3 represent fabrics subjected to a post-fabric formation agitation treatment process. Single plies of the fabric were agitated in an agitation type washing machine in the presence of hot water (15 minute wash cycle at 50° C.) and a commercial detergent (GAIN®), followed by a 5 minute rinse cycle in cold water of approximately 20° C., and a 5 minute extraction cycle. The plies were allowed to air dry naturally, and then formed into the multiple ply structure for testing. Comparative Examples 1-4 represent fabrics used as is without the agitation treatment.

The results of the spike threat (weight 1900 g, drop height 280 cm) are shown in Table 1.

TABLE 1

| | Fabric | Number of Plies | Panel Weight (g/m²) | Penetration? |
|---|---|---|---|---|
| Example 1 | TWARON ® 550 | 10 | ~2100 | No |
| Example 2 | TWARON ® 840 | 8 | ~2250 | No |
| Example 3 | TWARON ® 930 | 14 | ~2350 | No |
| Comparative Example 1 | TWARON ® 840 | 16 | ~4000 | Yes |
| Comparative Example 2 | TWARON ® 210 | 22 | ~2640 | Yes |
| Comparative Example 3 | TWARON ® 210 - open weave | 75 | ~5250 | Yes |
| Comparative Example 4 | KEVLAR ® Correctional Fabric | 14 | ~1680 | Yes |

As shown by the above results, the fabric treated according to the invention has superior stab resisting abilities than the non-treated fabrics.

The fabric of the present invention is also evaluated to determine the ballistic shooting limit velocity of the material before and after being treated in the post-fabric formation treatment process outlined above for Examples 1-3.

The shooting limit velocity evaluation comprised firing a 9 mm caliber bullet at a 90° angle with respect to the material of the present invention at a distance of 5 m. The material of the present invention is layered such that there are 24 layers of material. The results are shown in Table 2.

TABLE 2

| | Fabric | $V_{50}$ (m/s) | Nominal Dry Fabric Weight (kg/m²) | Maximum Trauma Depth (mm) | Maximum diameter of penetration (mm) |
|---|---|---|---|---|---|
| Comparative Example 5 (prior to processing) | TWARON ® 930 | 505 | 5.7 | 54 | 80 |

TABLE 2-continued

| | Fabric | $V_{50}$ (m/s) | Nominal Dry Fabric Weight (kg/m²) | Maximum Trauma Depth (mm) | Maximum diameter of penetration (mm) |
|---|---|---|---|---|---|
| Example 4 (after processing) | TWARON ® 930 | 484 | 5.7 | 48 | 80 |
| Comparative Example 6 (prior to processing) | TWARON ® 1100 | 484 | 6.7 | 44 | 80 |
| Example 5 (after processing) | TWARON ® 1100 | 468 | 6.7 | 45 | 80 |

The $V_{50}$ numerical values are arithmetical averages generated using a minimum of 3 partial and 3 complete penetration velocities of a specified projectile with all velocity measurements within a range of less than 39 meters per second.

Once the fabric of Comparative Example 5 was treated (Example 4), the anti-ballistic properties are slightly diminished, having a change of 21 m/s for the $V_{50}$. However, the fabric retained most of its ballistic stopping power. The same was true of Comparative Example 6, wherein a change of 16 m/s (in Example 5) is determined upon treating the fabric according to the present invention. Again, however, the reduced value of $V_{50}$ upon processing the fabric was not significant in reducing the overall anti-ballistic properties.

As can be seen from these results, the agitation treatment process somewhat reduces the ballistic resistance of the fabric, as does any post preparation process of such materials. However, the processed fabric still performs acceptably, particularly when considering that the fabric also exhibits an unexpectedly significantly increased stab resistance.

Fabrics processed according to exemplary embodiments of the present invention were also tested in accordance with Nil Standard-0115.00. In this test, fabric processed according to various exemplary embodiments of the present invention are subjected to a spike being dropped at an angle of either 45° or 0° with respect to a plane perpendicular to the processed fabric. The spike is dropped at the processed fabric having different numbers of layers at varying levels of energy.

Table 3 presents the average impact energies experienced by the fabric in ance with this test. The results are shown as the average amount of penetration by the into the fabric. The fabric layers of each of the examples in Table 3 comprise a 550 bric of 185 g/m² fabric weight.

In the examples wherein the angle of impact by the spike is 0°, the fabric the average penetration is greater than 20 mm. In the examples wherein the angle of by the spike is 45°, the fabric fails if the average penetration is greater than 7 mm.

TABLE 3

| Example | Number of Fabric Layers | Angle of Spike Impact (°) | Average Impact Energy (J) | Average Penetration by Spike (mm) |
|---|---|---|---|---|
| 1 | 8 | 0 | 35.94 | 0.4 |
| 2 | 10 | 0 | 50.28 | 0 |
| 3 | 12 | 0 | 64.75 | 0 |
| 4 | 15 | 0 | 65.51 | 0 |
| 5 | 10 | 45 | 24.19 | 0 |
| 6 | 10 | 45 | 33.02 | 0 |
| 7 | 12 | 45 | 32.97 | 0 |
| 8 | 12 | 45 | 43.07 | 0 |

As shown by the above results of Table 3, all the samples of the processed fabric of exemplary embodiments of the present invention pass the NU Standard-0115.00 for Stab resistance of Body Armor.

The present invention is also more drapable than typical stab resistant or anti-ballistic materials. This is because typically such materials are coated such that the material becomes less pliable and less willing to yield. The present processed fabric, however is more flexible and more easily adapted to varying situations. That is, the fabric is easier to work with and form into various articles and, in the use as protective clothing, more comfortable to the wearer.

The fabric of the invention alone is both stab and ballistic resistant. No additional sheets/layers of coatings of other materials are needed to provide stab resistance to the material as in the prior art. In other words, one can use plies of this processed fabric alone and get both the stab and ballistic resistant properties. Thus, plies of the fabric are preferably substantially free of any other sheets/layers or coatings intended for stab resistance.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A fabric consisting of yarn of a weight greater than about 500 dtex, wherein the fabric is a single layer having both stab resistant and anti-ballistic properties, and wherein the fabric is made by a method comprising agitating the fabric comprising yarn of a weight greater than about 500 dtex in an agitating or tumbling action washing machine, substantially removing a spin finish from the fabric before, during or after the agitating step, and drying the fabric, and wherein the agitating achieves a fabric having a frictional resistance that is increased compared to the fabric prior to the agitating, and wherein the fabric shrinks a minimum of at least about 1% via the agitating.

2. The fabric according to claim 1, wherein the stab resistant properties are in accordance with the National Institute of Justice Standard-0115.00 for Stab Resistance of Personal Body Armor.

3. The fabric according to claim 1, wherein the anti-ballistic properties are in accordance with the National Institute of Justice Standard-0101.04 for Ballistic Resistance of Personal Body Armor.

4. The fabric according to claim 1, wherein the fabric is formed into a multi-layered structure of at least 8 plies or more.

5. The fabric according to claim 1, wherein the yarn is para-aramid.

6. The fabric according to claim 1, wherein the yarn comprises from about 500 to about 1,500 filaments per strand of yarn, wherein the filaments have a measured fineness of less than about 1.65 dtex.

7. The fabric according to claim 1, wherein the yarn has a weight of about 550 to about 1,100 dtex.

8. The fabric according to claim 1, wherein the fabric is substantially free of a spin finish.

9. The fabric according to claim 1, wherein the shrinkage factor is from about 3% to about 5%.

10. The fabric according to claim 1, wherein the fabric is free of any foreign coatings or additives in an amount greater than about 2%.

11. The fabric according to claim 1, wherein the fabric has creases and wrinkles, and the wrinkles form at an angle of about 45° with respect to the weft and warp yarns of the fabric.

12. The fabric according to claim 1, wherein the fabric has creases and wrinkles, and the wrinkles form substantially parallel to the weft and warp yarns of the fabric.

13. The fabric according to claim 1, wherein the yarn of the fabric has agglomerations of fibrils in the area of openings or gaps between adjacent and intersecting yarns.

14. The stab resistant and ballistic resistant material of claim 1, wherein the material includes at least 2 plies of an additional fabric that does not exhibit the same stab resistant and anti-ballistic properties.

15. The fabric according to claim 1, wherein the fabric has stab resistant properties satisfying the National Institute of Justice Standard-0115.00 for Stab Resistance of Personal Body Armor, and has anti-ballistic properties satisfying the National Institute of Justice Standard-0101.04 for Ballistic Resistance of Personal Body Armor.

16. The fabric according to claim 1, wherein the yarn of the fabric exhibits fibrillation following the densification treatment.

17. A method of producing a fabric having both stab resistant and anti-ballistic properties and a minimum shrinkage factor of at least about 1% and a frictional resistance that is increased compared to the fabric prior to agitating, the method comprising agitating a densely woven fabric consisting of yarn of a weight greater than about 500 dtex in an agitating or tumbling action washing machine, substantially removing a spin finish from the fabric before, during or after the agitating step, and drying the fabric.

18. The method according to claim 17, wherein the yarn is para-aramid.

19. The method according to claim 17, wherein the yarn comprises from about 500 to about 1,500 filaments per strand of yarn, and wherein the filaments have a measured fineness of less than about 1.65 dtex.

20. The method according to claim 17, wherein the yarn has a weight of about 550 to about 1,100 dtex.

21. The method according to claim 17, wherein the agitating step occurs more than once.

22. The method according to claim 17, wherein the agitating step occurs in a liquid system.

23. The method according to claim 22, wherein the liquid system is selected from the group consisting of water, mild organic solvents, detergents and mixtures thereof.

24. The method according to claim 17, wherein the agitating step comprises agitating the fabric in a conventional washing machine.

25. The method according to claim 17, wherein substantially removing the spin finish comprises scouring the fabric.

26. The method according to claim 17, wherein single ply sheets of the fabric are subjected to the agitating step separately.

27. The method according to claim 17, wherein drying the fabric comprises air or heat drying.

28. The method according to claim 17, wherein the agitating and the substantially removing the spin finish leaves the fabric free of any foreign coatings or additives in an amount greater than about 2%.

29. The method according to claim 17, wherein the fabric is fed to the agitating step in a form of a rope.

30. The method according to claim 29, wherein the rope of fabric is exposed to a pressurized liquid system at elevated temperature in the agitating step.

31. The method according to claim 30, wherein the liquid system comprises water and a detergent.

32. The method according to claim 30, wherein the liquid is a dispersion of liquid particles in a gaseous medium.

33. The method according to claim 32, wherein the gaseous medium is air.

34. The method according to claim 30, wherein the liquid system induces a compaction and movement of the rope of fabric.

35. The method according to claim 34, wherein the compaction and movement take place in a cone shaped element of a device in which the agitating step is conducted.

36. The method according to claim 34, wherein the fabric is compacted in a direction of a length of the fabric by striking one or more baffle plates of a device in which the agitating step is conducted.

37. The method according to claim 29, wherein the fabric is compacted by torsion of the fabric.

38. The method according to claim 17, wherein the agitating step comprises agitating the fabric in a jet dyeing device.

* * * * *

UNITED STATES PATENT AND TRADEMARK OFFICE
CERTIFICATE OF CORRECTION

| | | |
|---|---|---|
| PATENT NO. | : 7,354,875 B2 | Page 1 of 1 |
| APPLICATION NO. | : 10/357457 | |
| DATED | : April 8, 2008 | |
| INVENTOR(S) | : David Hand and Lee Skelton | |

It is certified that error appears in the above-identified patent and that said Letters Patent is hereby corrected as shown below:

Column 2, line 21, "(NU)" should be --(NIJ)--.

Column 3, line 29, "polyarnides" should be --polyamides--.

Column 3, line 29, "copolyarnide" should be --copolyamide--.

Column 3, line 31, "copolyarnide" should be --copolyamide--.

Column 5, line 4, "and" should be --und--.

Column 6, line 6, "NU" should be --NIJ--.

Column 9, line 38, "Nil" should be --NIJ--.

Column 9, line 46, "ance" should be --accordance--.

Column 9, line 47, between "the" and "into", please insert --spike--.

Column 9, line 49, "bric" should be --dtex fabric--.

Column 9, line 51, after "fabric", please insert --fails if--.

Column 9, line 52, after "of", please insert --impact--.

Column 10, line 27, "NU" should be --NIJ--.

Signed and Sealed this

Eighth Day of July, 2008

JON W. DUDAS
*Director of the United States Patent and Trademark Office*